March 12, 1957     A. HIESTAND ET AL     2,785,092
CONDENSATION PRODUCT AND TEXTILE MATERIAL SOFTENED THEREWITH
Filed Aug. 2, 1954
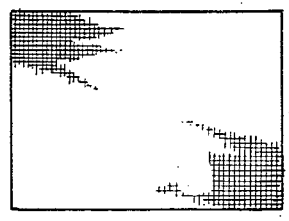
Textile Material with Soft Feel Produced by Impregnation with Polyalkylene Polyamine- Non-aromatic Carboxylic Acid- Acrylonitrile (or Acrylic Acid Amide) Condensation Product.
INVENTORS
ARMIN HIESTAND and
OTTO ALBRECHT
BY *Wenderoth, Lind & Ponack*
ATTORNEYS

2,785,092
CONDENSATION PRODUCT AND TEXTILE MATERIAL SOFTENED THEREWITH

Armin Hiestand, Binningen, and Otto Albrecht, Neuewelt, near Basel, Switzerland, assignors to Ciba Limited, Basel, Switzerland Application August 2, 1954, Serial No. 447,440

Claims priority, application Switzerland August 11, 1953

14 Claims. (Cl. 117—139.5)

According to this invention new condensation products are made by reacting one molecular proportion of a polyalkylene polyamine with at least two molecular proportions of a non-aromatic carboxylic acid with a hydrocarbon radical of high molecular weight or a functional derivative of such acid and with at least one molecular proportion of acrylonitrile or methacrylonitrile or acrylic acid amide or methacrylic acid amide, which may, if desired, be substituted, or the corresponding $\beta$-halogen propionic acid derivatives. The condensation products in the form of their water soluble salts, including their quaternary ammonium salts, are valuable textile assistants. They are especially suitable for producing a soft feel on the most varying types of fibers such as polyacrylonitrile fibers, viscose rayon, polyester fibers, cuprammonium rayon (Bemberg).

The polyamines used as starting materials for preparing the products of the invention should contain, apart from the hydrocarbon residues and the basic nitrogen atoms, no further substituents. There may be used, for example, diethylene triamine, dipropylene triamine, triethylene tetramine or tetraethylene pentamine, and also polyamines such as are obtainable by heating an ethylene dihalide with ammonia or an amine.

As non-aromatic carboxylic acids, which can be used for making the condensation products, there may be mentioned: Caprylic acid, lauric acid, palmitic acid, stearic acid, oleic acid, linoleic acid and also hardened train oil fatty acid or resin acids, such as abietic acid and naphthenic acids. As functional derivatives of such acids, there come into consideration their halides, esters or anhydrides. These acids and their derivatives contain a hydrocarbon radical of high molecular weight, i. e. one of about 8 to about 40 carbon atoms. Especially suitable acids are those containing an aliphatic radical of 12–18 carbon atoms.

The condensation products may be made by first reacting the polyalkylene polyamine with the carboxylic acid or functional derivative thereof, and then additively combining the product with acrylonitrile, methacrylonitrile or acrylic acid amide. Alternatively, the polyalkylene polyamine may first be additively combined with acrylonitrile, methacrylonitrile or acrylic acid amide, and then reacted with the carboxylic acid. Instead of carrying out the reaction with the acrylic acid derivatives there may also be used $\beta$-halogen propionic acid derivatives, for example, $\beta$-chloro-propionic acid nitrile, whereby water-soluble salts of the condensation products are formed direct. The reaction between the amine and the carboxylic acid or functional derivative thereof may be carried out under the conditions usual for such reactions. Similarly, for carrying out the additive combination with acrylic acid derivatives or methacrylic acid derivatives, there may be used the conditions known for additively combining these compounds with amines.

For salt formation there may be used inorganic or organic acids such, for example, as hydrochloric acid, sulfuric acid, methyl-sulfuric acid, acetic acid, lactic acid or formic acid. There may also be used for salt formation organic compounds which are capable of reacting with amines, to form salts, including quaternary ammonium salts. Such compounds are, for example, benzyl chloride or dimethyl sulfate. When pasted with water the salts form stable pastes which can be easily dissolved in treatment baths to be used in accordance with the invention.

Especially valuable products are obtained by starting from diethylene triamine and stearic acid. There may be mentioned for example, the acetate of the condensation product obtained by additively combining 1 molecular proportion of acrylonitrile with 1 molecular proportion of diethylene triamine and then condensing with 2 molecular proportions of commercial stearic acid, or the quaternary ammonium salt obtained by condensing 1 molecular proportion of diethylene triamine with 2 molecular proportions of comercial stearic acid, then additively combining with acrylonitrile and quaternating with benzyl chloride.

The production of a soft feel on the various fibers is carried out in a simple manner by impregnating the textile fibers in an aqueous bath containing a salt of a product described above at ordinary or a slightly raised temperature.

As polyacrylonitrile fibers, of which the feel is improved in accordance with the invention, there come into consideration homo-polymers and co-polymers, which advantageously contain at least 80 percent of polyacrylonitrile and if desired, other additions which enhance the basic character of the polymer or its solubility. As examples there may be mentioned the materials known in commerce under the names "Orlon" such as "Orlon 81" and "Orlon 41," and also "Acrylan" and "Dynel."

The accompanying sheet of drawing diagrammatically illustrates textile material to which a soft feel has been imparted by impregnation with a polyalkylene polyamine/non-aromatic carboxylic acid/acrylonitrile (or acrylic acid amide) condensation product according to the present invention.

The following examples illustrate the invention, the parts being by weight unless otherwise stated, and the relationship of parts by weight to parts by volume being the same as that of the kilogram to the liter:

*Example 1*

13.25 parts of acrylonitrile (one-quarter mol) are added dropwise to 26 parts of diethylene triamine (one-quarter mol) while cooling with water. The slightly warm mixture is then heated for one hour at 65–70° C., while stirring. The acrylonitrile additively combines completely with the diethylene triamine.

135 parts of commercial stearic acid (one half mol) are then added, and the whole is heated in an atmosphere of nitrogen at 160–165° C., while stirring depending on the amount of foaming, water vapor being evolved from the reaction mixture. After heating the mixture for 4–5 hours a test portion of the substance dissolves to a clear solution in dilute acetic acid.

10 parts of the above melt are mixed on a boiling water bath with 34 parts of hot acetic acid of 6.2 percent strength. There is obtained a fine slightly yellowish paste which can be diluted with water to a clear solution.

*Example 2*

The melt of the basic condensation product from diethylene triamine, acrylonitrile and stearic acid, prepared as described in the second paragraph of Example 1, is cooled to about 120–125° C., and then 32.5 parts of freshly distilled benzyl chloride are added. After stirring the reaction mixture for 2–3 hours and heating it to 120° C., a test portion of the mixture dissolves completely in water with warming.

The excess of benzyl chloride is then expelled in vacuo. To the resulting melt there are cautiously run in 600 parts of water at 70–80° C., while stirring or kneading the gelatinous mass which is immediately formed. The mass is kneaded at 80–90° C. until a fine homogeneous paste is obtained.

Instead of stearic acid, there may be used for preparing the condensation product a corresponding quantity of oleic acid, coconut oil fatty acids or a mixture thereof.

*Example 3*

A product similar to that described in Example 2 is obtained by using 30 parts of chloracetamide instead of 32.5 parts of benzyl chloride. The reaction conditions are the same, but it is of great advantage to add during the reaction 34 parts of a mixture of equal parts of dioxane and xylene. If it is desired to obtain a clear treatment bath, the mixture of solvents must be removed before the pasting operation in vacuo.

*Example 4*

The melt of the basic condensation product prepared as described in the second paragraph of Example 1 is stirred for one hour on a boiling water bath with 32.5 parts of freshly distilled neutral dimethyl sulfate.

After adding 600 parts of water at 60–70° C., there is obtained a very fine homogeneous suspension which, when freshly prepared, dissolves very easily in cold water.

*Example 5*

17.75 parts of acrylic acid amide (¼ mol) are dissolved with slight warming in 26 parts of diethylene triamine (¼ mol). After the addition of 135 parts of stearic acid (½ mol), the mixture is slowly heated, while stirring to 160–165° C. After heating the mixture for 4–5 hours a test portion is soluble in warm dilute acetic acid.

Into 10 parts of the above melt are run on a boiling water bath 34 parts of hot acetic acid of 6.2 percent strength. There is obtained a fine homogeneous paste which can be diluted easily with hot water.

*Example 6*

26.5 parts (½ mol) of acrylonitrile are added dropwise to 36.5 parts of triethylene tetramine (¼ mol), while cooling with water. After heating the mixture for one hour at 65–70° C., while stirring, there are added 135 parts of commercial stearic acid (½ mol) and the whole is heated to 160–165° C. in an atmosphere of nitrogen.

After reaching a reaction temperature above 100° C. the mixture is heated for 4–5 hours, and then a test portion dissolves clearly in warm dilute acetic acid.

By proceeding in the manner described in Example 2, there is obtained with 32.5 parts of benzyl chloride a water-soluble wax-like product.

If, instead of proceeding as described in the preceding paragraph, the procedure described in Example 3 is followed, there is obtained with chloracetamide, a water-soluble reaction product.

*Example 7*

The procedure is the same as described in Example 6, except that 202.5 parts (¾ mol) of commercial stearic acid are used instead of 135 parts. During this condensation a small amount of acrylonitrile is evolved from the reaction melt.

The wax-like substance so obtained is soluble in dilute warm acetic acid.

The product can be converted as described in Example 2 with benzyl chloride or as described in Example 3 with chloracetamide into the corresponding water-soluble reaction product.

*Example 8*

108 parts of hardened sperm oil are added to the base prepared as described in the second paragraph of Example 1, and the mixture is heated for an hour at 185–190° C., and the melt is maintained, while stirring, in an atmosphere of nitrogen for 5 hours at 185–195° C.

The product, which is wax-like at room temperature, can be converted with benzyl chloride as described in Example 2 into a very fine soft paste, which yields an opalescent solution when diluted with hot water.

Instead of hardened sperm oil there may be used in this example, 106.5 parts of coconut oil, whereby a soft wax-like substance is obtained which dissolves completely to give a clear solution in dilute acetic acid.

Instead of hardened sperm oil there may be used in this example, a mixture of 54 parts of hardened sperm oil and 67.5 parts of commercial stearic acid. The product obtained in this manner dissolves somewhat more clearly in dilute acetic acid than when hardened sperm oil alone is used.

*Example 9*

The condensation of the addition product from ¼ mol to triethylene tetramine and ½ mol of acrylonitrile with ½ mol of stearic acid as described in Example 6 is carried out in the presence of 500 parts by volume of boiling xylene. The water of condensation is removed from the reaction mixture by azeotropic distillation and separated from the xylene also carried over in a water separator, the xylene being allowed to run back into the flask. After distilling for 24 hours 8.6 to 8.8 parts of water are obtained. After distilling for a further 8 hours no appreciable splitting off of water takes place. Accordingly, 1 mol of water is split off per mol of fatty acid.

The wax-like mass obtained after distilling off the xylene in vacuo and cooling the mixture, is of a somewhat darker color than that prepared in Example 6, but it dissolves equally well in warm dilute acetic acid. There is obtained an acetic acid paste capable of being diluted with water by working up as described in the last paragraph of Example 1, or water-soluble pastes are obtained by working up as described in Examples 2 and 3 which contain reaction products with benzyl chloride and chloracetamide, respectively.

*Example 10*

113 parts of the basic condensation product from 1 mol of diethylene triamine and 2 mols of commercial stearic acid, which still contains 1 hydrogen atom bound to a secondary nitrogen atom, are dissolved in 100 parts of benzene while warming, and 10 parts of acrylonitrile are added dropwise at 65–70° C. The solution is then stirred for about 15 hours at 65–70° C. The benzene is then evaporated in vacuo. The acrylonitrile combines additively completely with the condensation product with the formation of a wax-like mass which dissolves to a clear solution in dilute warm acetic acid.

10 parts of the addition product so obtained are melted on a boiling water bath and mixed with 34 parts of hot acetic acid of 6.2 percent strength, while vigorously stirring. There is obtained a fine yellowish brown paste which can be diluted with water.

165 parts of the addition product obtained as described in the first paragraph of this example are melted and stirred at 100° C. with 32.5 parts of freshly distilled benzyl chloride until a test portion is water-soluble. The excess of benzyl chloride is then removed in vacuo, and 600 parts of water at 70–80° C. are added to the melt while stirring well. The mass is further stirred until a homogeneous paste is obtained.

165 parts of the addition product obtained as described in the first paragraph of this example are melted, and 32.5 parts of neutral dimethyl sulfate are added dropwise at 95–100° C. After stirring for a short time, 600 parts of water at 60–70° C. are added while stirring well. There is obtained a paste which can be diluted with water while warming.

*Example 11*

A yarn of polyacrylonitrile fibers is treated for 30 minutes at 30–40° C. and at a liquor ratio of 1:30 in an aqueous bath in which has been dissolved a paste obtainable as described in any one of Examples 1–10 or 13–15 in a proportion amounting to 0.4 to 1 percent calculated on the weight of the yarn. After being dried the yarn has a soft feel.

*Example 12*

Viscose rayon is treated for 30 minutes and 20–30° C. and at a liquor ratio of 1:30 in a bath which contains 0.1–1 percent of the condensation product obtainable as described in Examples 1–10 or 13–15. The rayon is then dried at 80° C. A viscose rayon with a soft feel is obtained.

Instead of to the viscose rayon fiber, a soft feel can be given to the following fibers: cotton, linen, acetate rayon, Bemberg silk, polyester fibers, for example to such as are made from polyethylene terephthalate, and fibers from polyamides and the various forms in which they are worked up.

*Example 13*

Operations are carried out as described in Example 10 but, instead of using 10 parts of acrylonitrile, a warm benzene solution, in which 13.4 parts of acrylic acid amide are dissolved, is used.

A pale yellow wax-like product is obtained which is soluble in dilute warm acetic acid and which, according to the process of Example 10, can be converted into an acetic acid paste or into a paste which contains the reaction product with benzyl chloride.

*Example 14*

Operations are carried out as described in Example 10 but, instead of using 10 parts of acrylonitrile, 16.9 parts of β-chloro-propionitrile are used. There is obtained the water-soluble hydrochloride of the wax-like addition product of Example 10.

*Example 15*

A solution of 28.3 parts of diethylene triamine and 16.75 parts of methacrylonitrile (¼ mol), containing 0.1 percent of hydroquinone, is heated for 72 hours at 80–85° C. while stirring. Under these working conditions the methacrylonitrile additively combines completely with the diethylene triamine.

140 parts of commercial stearic acid are then added, and the whole is heated in vacuo at 160–165° C. while stirring depending on the amount of foaming. After heating the mixture for 2–3 hours a test portion of the substance dissolves to a clear solution in dilute acetic acid.

10 parts of the above melt are mixed on a boiling water bath with 2 parts of glacial acetic acid, whereupon, while stirring and adding 38 parts of hot water, a slightly yellowish paste is obtained which can be diluted with more water to a clear solution.

What is claimed is:

1. As a new chemical compound a member selected from the group consisting of condensation products from one molecular proportion of a polyalkylene polyamine which is free from other substituents apart from the hydrocarbon radicals and the basic nitrogen atoms, 2 to 3 molecular proportions of an aliphatic monocarboxylic acid having a hydrocarbon radical of 12 to 18 carbon atoms and 1 to 2 molecular proportions of a member selected from the group consisting of acrylonitrile, methacrylonitrile, acrylic acid amides, methacrylic acid amides and β-chloro-propionic acid nitrile; and water-soluble salts of said condensation products.

2. As a new chemical compound a member selected from the group consisting of condensation products from one molecular proportion of a polyalkylene polyamine which is free from other substituents apart from the hydrocarbon radicals and the basic nitrogen atoms, 2 to 3 molecular proportions of an aliphatic monocarboxylic acid with a hydrocarbon radical of 12–18 carbon atoms and 1 to 2 molecular proportions of acrylonitrile; and water-soluble salts of said condensation products.

3. As a new chemical compound the condensation product from one molecular proportion of diethylene triamine, two molecular proportions of stearic acid and 1 molecular proportion of acrylonitrile.

4. As a new chemical compound the acetate of the condensation product from one molecular proportion of diethylene triamine, two molecular proportions of stearic acid and 1 molecular proportion of acrylonitrile.

5. As a new chemical compound the benzyl chloride addition product of the condensation product from one molecular proportion of diethylene triamine, two molecular proportions of stearic acid and 1 molecular proportion of acrylonitrile.

6. An organic fibrous textile material of enhanced soft feeling which has incorporated in it a member selected from the group consisting of condensation products from one molecular proportion of a polyalkylene polyamine which is free from other substituents apart from the hydrocarbon radicals and the basic nitrogen atoms, 2 to 3 molecular proportions of an aliphatic monocarboxylic acid having a hydrocarbon radical of 12 to 18 carbon atoms and 1 to 2 molecular proportions of a member selected from the group consisting of acrylonitrile, methacrylonitrile, acrylic acid amides, methacrylic acid amides and β-chloro-propionic acid nitrile; and water-soluble salts of said condensation products.

7. An organic fibrous textile material of enhanced soft feeling which has incorporated in it a member selected from the group consisting of condensation products from one molecular proportion of a polyalkylene polyamine which is free from other substituents apart from the hydrocarbon radicals and the basic nitrogen atoms, 2 to 3 molecular proportions of an aliphatic monocarboxylic acid with a hydrocarbon radical of 12–18 carbon atoms and 1 to 2 molecular proportions of acrylonitrile; and water-soluble salts of said condensation products.

8. An organic fibrous textile material of enhanced soft feeling which has incorporated in it the condensation product from one molecular proportion of diethylene triamine, two molecular proportions of stearic acid and one molecular proportion of acrylonitrile.

9. An organic fibrous textile material of enhanced soft feeling which has incorporated in it the acetate of the condensation product from one molecular proportion of diethylene triamine, two molecular proportions of stearic acid and one molecular proportion of acrylonitrile.

10. An organic fibrous textile material of enhanced soft feeling which has incorporated in it the benzyl chloride addition product of the condensation product from one molecular proportion of diethylene triamine, two molecular proportions of stearic acid and one molecular proportion of acrylonitrile.

11. As a new chemical compound the condensation product from one molecular proportion of triethylene tetramine, two molecular proportions of acrylonitrile and two molecular proportions of stearic acid.

12. As a new chemical compound the condensation product from one molecular proportion of diethylene triamine, one molecular proportion of methacrylonitrile and two molecular proportions of stearic acid.

13. An organic fibrous textile material of enhanced soft feeling which has incorporated in it the condensation product from one molecular proportion of triethylene tetramine, two molecular proportions of acrylonitrile and two molecular proportions of stearic acid.

14. An organic fibrous textile material of enhanced soft feeling which has incorporated in it the condensation product from one molecular proportion of diethylene triamine, one molecular proportion of methacrylonitrile and two molecular proportions of stearic acid.

References Cited in the file of this patent

UNITED STATES PATENTS

| | | |
|---|---|---|
| 2,304,369 | Morgan et al. | Dec. 8, 1941 |
| 2,459,062 | Cook et al. | Jan. 11, 1949 |
| 2,468,086 | Latham et al. | Apr. 26, 1949 |